(12) United States Patent
Ren et al.

(10) Patent No.: US 9,685,676 B2
(45) Date of Patent: Jun. 20, 2017

(54) MODULAR BIOELECTROCHEMICAL SYSTEMS AND METHODS

(75) Inventors: Zhiyong Ren, Superior, CO (US); Casey Forrestal, Wheat Ridge, CO (US); Pei Xu, Las Cruces, NM (US)

(73) Assignee: The Regents of the University of Colorado, Denver, CO (US)

( * ) Notice: Subject to any disclaimer, the term of this patent is extended or adjusted under 35 U.S.C. 154(b) by 372 days.

(21) Appl. No.: 14/345,104

(22) PCT Filed: Sep. 14, 2012

(86) PCT No.: PCT/US2012/055562
§ 371 (c)(1),
(2), (4) Date: Sep. 8, 2014

(87) PCT Pub. No.: WO2013/040450
PCT Pub. Date: Mar. 21, 2013

(65) Prior Publication Data
US 2015/0064501 A1    Mar. 5, 2015

Related U.S. Application Data

(60) Provisional application No. 61/535,006, filed on Sep. 15, 2011, provisional application No. 61/603,005, filed on Feb. 24, 2012.

(51) Int. Cl.
*H01M 8/16* (2006.01)
*H01M 8/0247* (2016.01)
(Continued)

(52) U.S. Cl.
CPC ............. *H01M 8/16* (2013.01); *C02F 1/4691* (2013.01); *C02F 3/005* (2013.01);
(Continued)

(58) Field of Classification Search
CPC ....................................... H01M 8/16
See application file for complete search history.

(56) References Cited

U.S. PATENT DOCUMENTS 5,415,768 A    5/1995 Andelman
6,462,935 B1   10/2002 Shiue et al.
(Continued)

FOREIGN PATENT DOCUMENTS

| CN | 101267045 A | 9/2008 |
| CN | 101331088 A | 12/2008 |
| CN | 101481178 A | 7/2009 |

OTHER PUBLICATIONS

International Search Report for PCT/US2012/055562 dated Jan. 28, 2013, from the Korean Intellectual Property Office.
(Continued)

*Primary Examiner* — Stewart Fraser
*Assistant Examiner* — Rachel L Zhang
(74) *Attorney, Agent, or Firm* — Holland & Hart LLP

(57) ABSTRACT

Bioelectrochemical systems (BES) having configurations with spiral wound structures and with frame-and-plate structures are provided. Systems may allow for production of an electrical current that is at least partially generated by microorganisms connected directly or indirectly to an electrode. A spiral wound or frame-and-plate type bioelectrochemical system that may be used for energy or chemical production, and/or desalination may include an anolyte influent point, a catholyte influent point, electrodes, ion selective membranes, mesh separators, gas collection devices, an exterior containment vessel, and one or more external electrical devices.

9 Claims, 12 Drawing Sheets

(51) Int. Cl.
 *H01M 8/04082* (2016.01)
 *C02F 1/469* (2006.01)
 *C02F 3/00* (2006.01)
 *C02F 3/12* (2006.01)

(52) U.S. Cl.
 CPC ..... *H01M 8/0247* (2013.01); *H01M 8/04082* (2013.01); *C02F 3/1268* (2013.01); *C02F 2303/10* (2013.01); *Y02E 60/527* (2013.01); *Y02W 10/15* (2015.05); *Y02W 10/30* (2015.05)

(56) References Cited

U.S. PATENT DOCUMENTS

| | | |
|---|---|---|
| 6,510,043 B1 | 1/2003 | Shiue et al. |
| 2001/0013471 A1 | 8/2001 | Hartel et al. |
| 2008/0105551 A1 | 5/2008 | Wang et al. |
| 2010/0270158 A1 | 10/2010 | Logan |
| 2012/0292187 A1* | 11/2012 | Kim .................. B01D 61/44 204/527 |

OTHER PUBLICATIONS

Application No. 201280055932.5 First Office Action of Oct. 9, 2015 for Applicant the Regents of the University of Colorado, from the State Intellectual Property Office of the People's Republic of China.
Cao, Xiaoxin, et al., "A New Method for Water Desalination Using Microbial Desalination Cells," Environ. Sci. Technol. published on Web Jul. 24, 2009, vol. 43, No. 18, 7148-7152.
Mehanna, Maha, et al., "Using Microbial Desalination Cells to Reduce Water Salinity Prior to Reverse Osmosis," Energy Environ. Sci., vol. 3, 1114-1120, the Royal Society of Chemistry.
Supplementary European Search Report for Application No. EP 12832427, dated May 18, 2015, from European Patent Office, Munich Germany.

* cited by examiner

MODULAR BIOELECTROCHEMICAL SYSTEMS AND METHODS

CROSS-REFERENCE TO RELATED APPLICATIONS

This application is a U.S. National stage of pending application PCT/US2012/055562, filed Sep. 14, 2012, entitled, "MODULAR BIOELECTROCHEMICAL SYSTEMS AND METHODS," which claims priority to U.S. Provisional Patent Application No. 61/535,006, filed on Sep. 15, 2011, entitled "Modular Bioelectrochemical System and Method", and U.S. Provisional Patent Application No. 61/603,005, filed on Feb. 24, 2012, entitled "Bioelectrochemical Desalination Processes and Devices." The entire disclosure of each of these applications is incorporated herein by reference.

STATEMENT REGARDING FEDERALLY SPONSORED RESEARCH

This invention was made with government support under grant number N00014-10-M-0232 awarded by the Office of Naval Research. The government has certain rights in the invention.

FIELD

This disclosure relates generally to devices for electricity production or value added chemical production using a spirally wound bioelectrochemical system (BES) or microbial fuel cell (MFC). More specifically the present disclosure provides BES reactors with frame-and-plate structure, concentrically wound, or similar configurations for simultaneous biodegradable material oxidation, energy production, chemical production, and/or desalination. The present disclosure also provides methods and devices for capacitive microbial deionization of liquids using microbially charged capacitors to remove charged-carrying organic and/or inorganic aqueous materials.

BACKGROUND

Worldwide concerns on environmental pollution, energy depletion, and climate change are compelling environmental engineers to expand their responsibilities from pollution clean-up to sustainable development of energy and environmental systems. One emerging direction is to transform wastewater infrastructure from simple treatment processes to integrated energy and valuable product recovery systems. Current wastewater treatment processes and membrane based desalination technologies are energy intensive due to the power demand for aeration, sludge treatment, and membrane operation. For example, it is estimated that every year, the U.S. uses approximately 57 Terawatt hours of electricity for wastewater treatment, accounting for 1.5% of the national total electricity production (equivalent to 5.4 million households' annual electricity use). A sustainable approach to wastewater treatment considers recovering the energy content of organic matters while simultaneously achieving treatment objectives because energy content embedded in wastewater is estimated to be about 2-4 times the energy used for water infrastructure in the U.S. This means it may be possible to make wastewater treatment self-sufficient.

Furthermore, improving water supply and quality in many places around the world would aid in mitigating many problems facing both developed and developing countries. The United Nations estimates that due to a global increase in population of 80 million people per year, an additional 64 billion cubic meters per year of freshwater is required. Lack of water could lead to the displacement of 24-700 million people, greater national insecurity, and world conflict. Inadequate water sanitation and supply has been linked to many diseases such as malaria, cholera and typhoid. The World Health Organization estimates that, with improvements to water supply, sanitation and hygiene 4%-75% of the global diarrhea disease burden could be prevented. It is apparent that increasing freshwater production would drastically improve humanity. The problem with increasing water supply is that energy is required for the production of all water, and water is required for the production of all energy. This phenomenon, known as the water energy nexus, thus far has prevented a sustainable method of producing energy or water. One clear indicator of the water energy nexus is that in the U.S., water used for cooling power plants equals the amount of water used for agriculture.

Currently the two main methods by which saltwater can be desalinated is with electrodialysis (ED) or reverse osmosis (RO). However, these technologies are not sustainable because of the substantial amount of external energy required. In 2008 a significant advance was made by the development of a microbial desalination fuel cells (MDC) which can desalinate water without any external energy. MDC technology uses microorganisms to oxidize a substrate, potentially municipal wastewater, to generate the energy required for desalination. The main problem with the MDC technology is that the ions from desalination become concentrated in the anode and cathode chambers. This concentration of ions in the anode and cathode chambers prevents MDC from being a sustainable method for desalination. If wastewater was used as the substrate, the increase in total dissolved solids (TDS) can prevent the treated wastewater from being reused.

With respect to wastewater, direct energy production from waste materials via bioelectrochemical systems (BESs) offers economic and environmental benefits because the energy produced offsets the energy consumption associated with treatment and reuse processes. BESs may use microorganisms to catalyze the oxidization of organic and inorganic electron donors in the anode chamber and deliver electrons to the anode. The electrons may be captured directly for electricity generation, in devices such as microbial fuel cells (MFCs). In other examples, the electrons may be supplemented by external power input for producing hydrogen, methane, or value-added chemicals in devices such as microbial electrolysis cells (MECs). The electrons may also be used in the cathode chamber to remediate contaminants such as uranium, chlorinated solvents, and perchlorate. The potential across the electrodes may, in other examples, also drive desalination through MDCs.

Compared to traditional environmental technologies, which generally provide one approach for pollutant control, bioelectrochemical systems offer both oxidation and reduction approaches for waste treatment, contaminant remediation, energy and water recovery. On the anode side, BESs can theoretically oxidize any biodegradable substrate and extract electrons to the anode. In addition to simple sugars and derivatives, many complex waste materials have been utilized such as wastewater effluents, biomass, landfill leachate, and petroleum hydrocarbons. On the cathode side, any electron acceptor type of contaminants can potentially be reduced using the electrons supplied from the cathode.

Such contaminants include chlorinated solvents, perchlorate, chromium, uranium, etc.

An advantage of using BESs in wastewater treatment is its potential to convert traditional energy intensive treatment processes into energy gaining processes while still achieving treatment objectives. However, despite the great potentials BES offers in environmental engineering, the energy output highly depends on the degradability of the substrate, the reactor architecture, and the active microbial community. Though the power density from lab scale, acetate based reactors has increased from less than 1 mW/m$^2$ to 6.9 W/m$^2$ in the past decade, the power output from real wastewater is much lower compared to simple substrates due to the low biodegradability, conductivity, and buffer capacity in wastewater. For example, by using the same configuration of lab scale reactors, the maximum power density achieved from acetate (1.69 W/m$^2$ or 42 W/m$^3$) was more than 8 times higher than the power output from brewery wastewater (0.21 W/m$^2$, or 5.1 W/m$^3$) according to one test.

The restraints of wastewater in power production from BESs become more apparent in larger scale systems. Though the first 2 m pilot reactor has been operating since 2007 in Australia using brewery wastewater, the performance is reported to be unsatisfactory. One main reason identified is the low conductivity and alkalinity of the wastewater. The loss of electrons in the anode chamber results in the accumulation of protons, which will reduce the pH in anode chamber and inhibit microbial activity. Therefore, lab scale studies generally use high strength phosphate or carbon buffer solution (50-200 mM) to maintain pH neutrality. The buffer solution also provides additional conductivity to facilitate ion transfers to reduce system resistance. However, compared with buffer enhanced anolyte in lab studies, which keeps a neutral pH and high conductivity (~20 mS/cm), real wastewater has a very low conductivity (1-2 mS/cm) and buffer capacity, leading to significant pH reduction and internal resistance increase that results in reduced power output from BES reactors. Because the continuous addition of buffer solution is costly and unsustainable, the nature of wastewater is one main challenge to be addressed before BES can be utilized on a large scale. Another approach to minimize the internal resistance is to reduce the distance between the electrodes. Porous separators such as J-cloth, glass fiber, and ion exchange membranes can reduce electrode spacing, provide electrode insulation, and decrease oxygen intrusion to improve electron recovery. Such separators are generally sandwiched between the anode and the cathode, but the reactor geometry becomes a challenge due to the risk of short circuit and deforming, especially when high surface brush anode was used. Tubular configuration with brush anode surrounded by a layer of cloth cathode is currently considered relatively feasible for larger scale reactors, but this configuration has been associated with a significant water leaking problems because the membrane/cathode assembly cannot hold the high static water pressure at larger scale. In addition, the low cathode surface area of the tubular design limited the power output.

SUMMARY

According to various embodiments, the production of an electrical current is at least partially generated by microorganisms or enzymes connected directly or indirectly to an electrode in a frame-and-plate type or spiral wound type bioelectrochemical system. A spiral wound type bioelectrochemical system may include but is not limited to anolyte influent tube, catholyte influent tube, electrodes, ion selective membranes, mesh separators, gas collection device, an exterior containment vessel around the spirally wound electrodes, exterior containment for the ends of the reactor, and/or exterior containment with an air permeable electrode, and adhesive materials. A frame-and-plate type bioelectrochemical system may include but is not limited to an anode reaction chamber with an anode electrode and electrochemically active microorganism, a deionization or desalination chamber, a cathode chamber with cathode electrode, current collection devices, ion selective membranes, mesh separators, and gas collection devices.

In one embodiment, the present disclosure provides a modular bioelectrochemical system (BES) reactor comprising a centrally located tube and spirally wound anode chamber. In this embodiment, anolyte enters the reactor from the centrally located tube, and flows from the center tube through perforated holes contained inside an anode chamber. The anode chamber is formed within the anode electrode, porous spacer, separator or ion selective membranes. The anolyte may flow through the anode chamber passively or through a series of channels formed by ion exchange membranes, physical separators, or adhesive materials. The anolyte flows though the anode channel which is concentrically wound around the center tube and back to the centrally located tube, or to an externally located tube, to be expelled out of the reactor. The anode chamber contains, for example, an electrode which has acclimated exoelectrogenic microorganisms. A catholyte, or electron acceptor, may either be directly connected to the anode chamber through an air permeable cathode or can flow through a second centrally located tube or passively flow through the top of the concentrically wound assembly.

Another embodiment in the disclosure provides a modular BES reactor in which an anolyte enters the reactor through an external tube which is connected to an anode chamber concentrically wound around a center effluent tube. The anolyte flows from the exterior of the reactor through the anode chamber formed by either an air permeable electrode or an ion exchange membrane. In some examples, the entire reactor may be placed inside a containment vessel. The catholyte or electron acceptor can either flow through an external tube directly connected to a cathode chamber concentrically wound around the center effluent tube, or passively flow from the top of the reactor across the wound assemblages formed by a porous spacer next to the anode chamber. There may be multiple stacks of middle chambers separated from the anode and cathode chamber for desalination and other additional functions.

In other aspects of the disclosure, methods, systems, and devices are described for bioelectrochemical processes that may be used for various purposes, such as desalination. Traditional desalination technologies are energy intensive and generate large amount of concentrate. Some embodiments provide microbial capacitive desalination cells (MCDC) which provide a bioelectrochemical approach to achieve sustainable salt removal and management. In some embodiments, salt removal and management is achieved without using external energy. The MCDC addresses challenges currently associated with microbial desalination cells (MDCs) including salt migration and pH fluctuation problems. Using high surface area electrode assemblies for capacitive adsorption of ions, the MCDC increases desalination efficiency, in some embodiments, by 7-25 times over conventional capacitive deionization (CDI). Devised disclosed herein may also remove ions from the anode, cathode, and desalination chamber, which enhances the reactor capability in simultaneous salt management, wastewater treatment, and energy production. Nearly full recovery of salt during MCDC regeneration also makes salt production possible, according to some embodiments.

DETAILED DESCRIPTION

Figure 1:
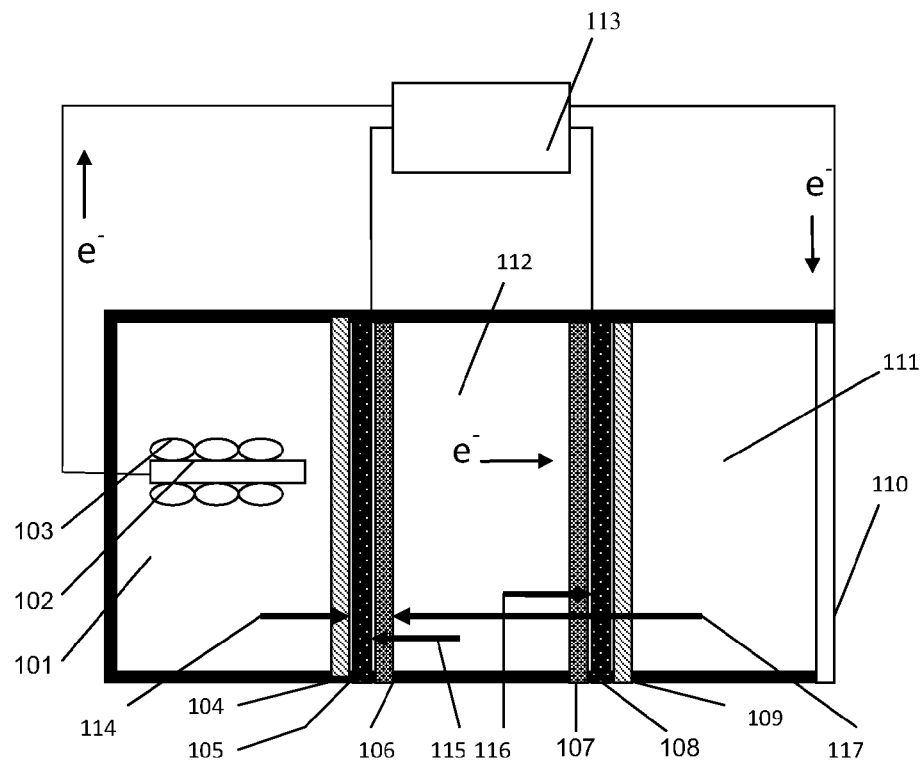
FIGS. 1-2 are illustrations of a bioelectrochemical reactor according to an embodiment.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Bioelectrochemical systems (BES) having configurations with spiral wound structures and with frame-and-plate structures are described for various different embodiments. Systems, devices, and methods are described for microbial desalination cells (MDCs) that use electrical current generated by microbes to simultaneously treat wastewater, desalinate water, and produce bioenergy or biochemicals. A microbial capacitive desalination cell (MCDC) addresses salt migration and pH fluctuation problems facing current MDCs and improves the efficiency of capacitive deionization. The anode and cathode chambers of the MCDC are separated from the middle desalination chamber by two specially designed membrane assemblies, comprising cation exchange membranes and layers of activated carbon cloth (ACC). According to various embodiments, taking advantage of the potential generated across the microbial anode and the air-cathode, the MCDC may remove dissolved solids without using any external energy. The MCDC desalination efficiency, according to various embodiments, is significantly higher, and in some embodiments 7 to 25 times higher, than traditional capacitive deionization processes. Compared to MDC systems, where the volume of concentrate can be substantial, all or at least a significant amount of the removed ions in the MCDC are adsorbed in the ACC assembly double layer capacitors without migrating to the anolyte or catholyte, and the electrically adsorbed ions may be recovered during assembly regeneration. The two cation exchange membrane based assemblies allow the free transfer of protons across the system and thus prevent significant pH changes observed in traditional MDCs.

The terms "microbial capacitive deionization cell" and "capacitive microbial desalination cell" are interchangeable and herein referred to as the devices. The devices of the present disclosure use electrochemically active microorganisms to catalyze the oxidation a reduced substrate and transfer electrons to an anode electrode. The electrons then pass through an active electrode forming a capacitor for ion adsorption. The types of active electrode materials will be described later. The charge potential forming the capacitor is applied by the charge potential difference between the anode and cathode electrodes. Electrolyte solution contained in the anode, cathode, and deionization chambers are physically separated by ion exchange membranes. Deionization occurs in the devices by either electrochemically adsorbing the ions directly from the electrolyte solution and/or by transferring the ion from the anode or cathode electrolytes to the deionization chamber for adsorption.

In some embodiments, devices of the present disclosure maybe used to produce hydrogen gas or methane gas in a configuration referred to as a microbial capacitive electrolysis deionization cell (MCEDC). The energy for electrolysis may be supplied, in whole or in part, by bioelectrochemical reactors in combination with the MCEDC or through an external DC power supply.

In some embodiments, devices of the present disclosure maybe used to produce inorganic and organic chemicals in a configuration referred to as a microbial chemical cell (MCC). The chemical production maybe catalyzed by enzymes or microorganisms.

Various embodiments of systems for deionization according to the present disclosure include applying the electrical potential to the activated electrode with a positive or negative potential placed next to a cation exchange membrane (CEM) adjacent to anode chamber. Additionally, the activated electrode may be placed inside the anode and cathode chambers and/or inside a deionization chamber. The use of an anion exchange membrane (AEM) in addition to a CEM placed next to either the anode or cathode chamber, according to some embodiments, allows for specific desired ions to transverse ion selective barriers for device specific desired results. One or more activated electrode assemblies, membranes, spacers, conductive electrodes, and seals may be used in various embodiments, depending upon the particular requirements of an application.

With reference now to FIG. 1, an embodiment of the invention is described. The apparatus of FIG. 1 is a frame-and-plate structured reaction vessel that provides general design and operation of a microbial capacitive desalination system. The apparatus includes three reaction chambers, an anode reaction chamber 101 with an anode electrode 102 and electrochemically active microorganism 103, a deionization or desalination chamber 112, and a cathode chamber 111. In this configuration a CEM 104 is placed next to the anode chamber 101, and a CEM 109 is placed next to the cathode chamber 111. Activated high surface area electrodes 106, 107 are placed inside the deionization or desalination chamber and the potential from the anode chamber 101 is applied to the activated electrode 106 next to the anode chamber 101. Current collectors 105, 108 are located adjacent to the electrodes 106, 107, and provide an electrical connection to external electrical devices 113. In operation the electrons generated in the anode chamber 101 pass through to the first activated electrode 106 in the deionization or desalination chamber 112 then through an electrolyte solution in chamber 112 to the second activated electrode 108 and finally to cathode electrode 110. Anions 115 move towards the activated electrode 106 next to the anode chamber 101 and cations 116 move towards the activated electrode 108 next to the cathode chamber 111. Additionally, cations 115 move from the anode chamber 101 through the CEM 104 to the activated electrode 106. After the activated electrodes 106, 107 become saturated in ions the potential from the anode 106 and cathode 107 electrodes are removed, switched in polarity, or an externally applied DC potential removes the adsorbed ions. After all of the ions are removed from the activated electrodes 106, 107 they are thus termed "regenerated".

Electrons generated in the anode chamber 101 by microorganisms 103 are transferred to an anode electrode 106 where they are transferred to an external electronic device 113 for storage or immediately applied to a high surface area electrode 106, 107 inside a desalination chamber. Cations and protons generated in the anode chamber 101 pass from the anode chamber 101 through the ion exchange membrane 104 and desalination chamber 112 to the cathode chamber 111, illustrated by arrow 114, where they are reduced. The electrical potential generated on the high surface area electrodes 106, 107 form a capacitor for ion adsorption. When the electrical potential is removed from the high surface area electrodes 106, 107, the stored energy can be recaptured by the external electrical devices 113. Ions adsorbed by the electrical potential are then desorbed from the high surface area electrodes 106, 107. External electrical devices may include, for example, one or more of resistors, DC/DC inverters, computers, power sources, capacitors, transistors, and/or other electronic devices.

In some embodiments, multiple ion selective barriers with multiple activated electrodes are included in a "stack configuration". Alternatively multiple ion selective barriers may be used with intermittent activated electrodes assemblies. Charged ions pass through a chamber which contains a charged activated electrode or through the electron motive force pass through a selective ion barrier to a chamber which would contain an activated electrode for adsorption.

Figure 2:
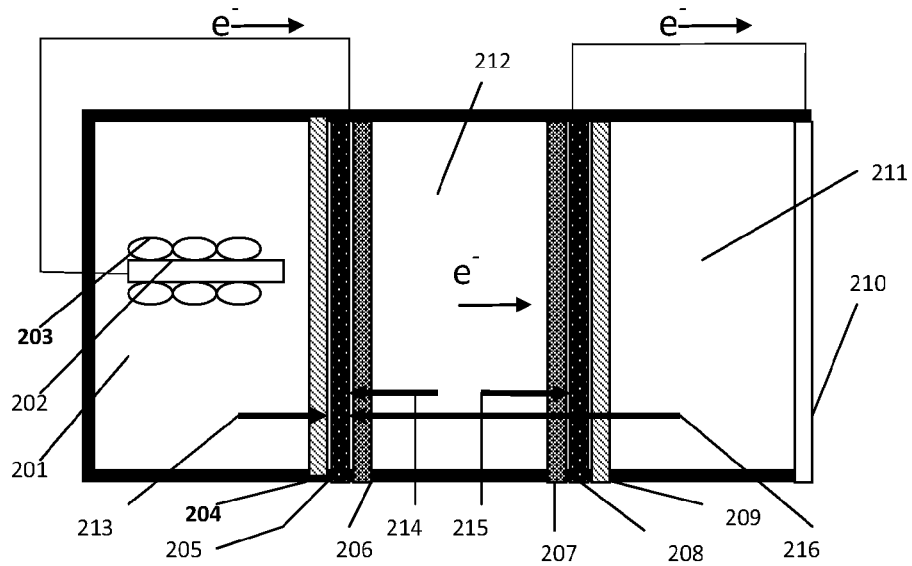

FIG. 2 illustrates the general design and operation of a microbial capacitive desalination system according to an embodiment. In this configuration, electrons generated in the anode chamber 201 by microorganisms 203 are transferred to an anode electrode 202 where they are transferred and immediately applied to a high surface area electrode 206 inside a desalination chamber 212. Ion exchange membranes 204, 209 are placed adjacent current collectors 205, 208, in the anode chamber 201 and cathode chamber 211. High surface area electrodes 206, 207 are placed adjacent the current collectors 205, 208 in desalination chamber 212. Cations and protons 213 generated in the anode chamber 201 pass from the anode chamber 201 through the ion exchange membrane 204 and desalination chamber 212 to cathode chamber 211 having a cathode electrode 210 where they are reduced. The electrical potential generated on the high surface area electrodes 206, 207 form a capacitor for ion adsorption. When the electrical potential is removed from the high surface area electrodes 206, 207 through current collectors 205, 208, the stored energy can be recaptured by external electrical devices. Ions adsorbed by the electrical potential are then desorbed from the high surface area electrodes 206, 207. In operation, cations 214 move from the desalination chamber to the first high surface area electrode, anions 215 move from the desalination chamber to the second high surface area electrode, and cations 216 move from the cathode chamber to the first high surface area electrode.

Figure 3:
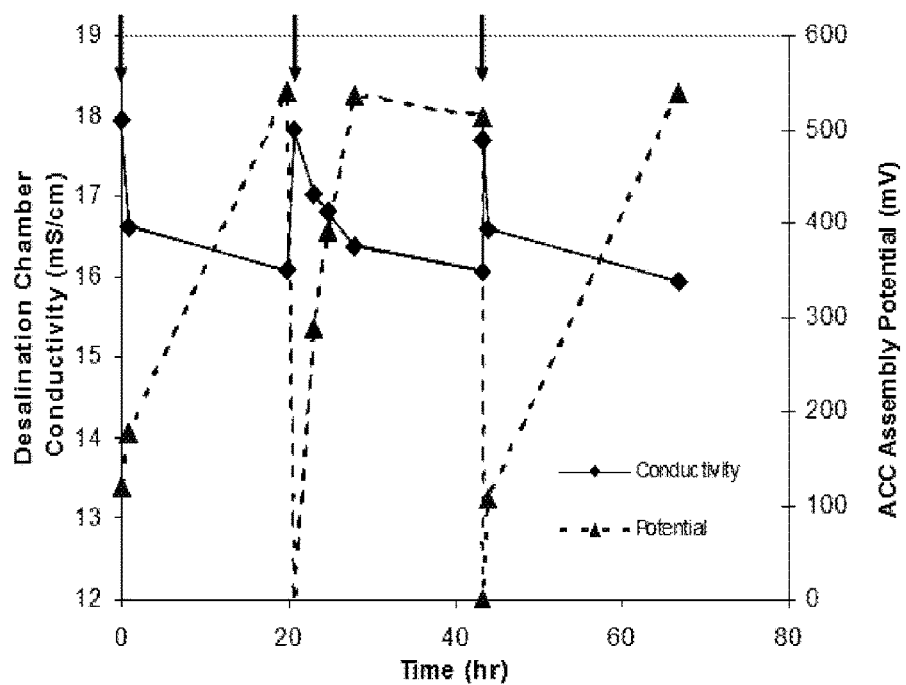
FIG. 3 illustrates the correlation between the charge potential across ACC assemblies and the conductivity changes in the desalination chamber due to electrical adsorption. Arrows indicate changes in electrolyte solution in batch cycles according to an embodiment.

FIG. 3 depicts the operation of a microbial capacitive desalination system according to an exemplary embodiment. Arrows indicate a single batch operation of the system. The graph shows that when the electrical potential on the high surface area electrodes (ACC Assembly Potential) increases the conductivity or amount of free ions in solution decreases. When the electrical potential is removed conductivity or amount of free ions in solution returns to the starting operation.

Figure 4:
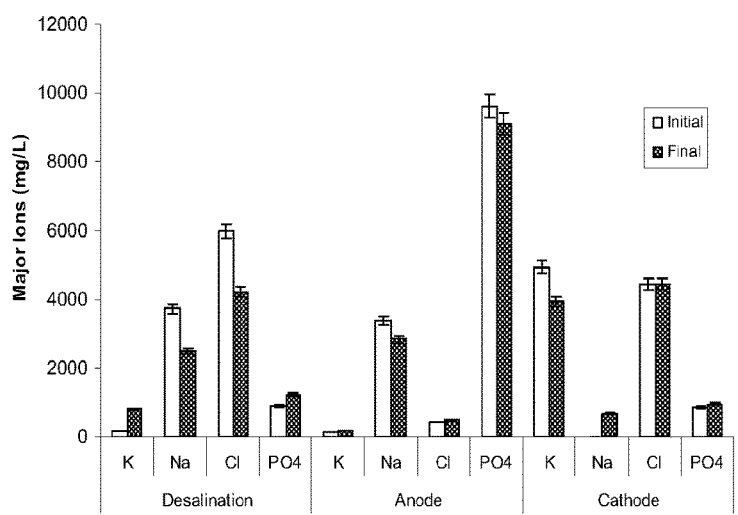
FIG. 4 illustrates concentration changes of the four major ions (Potassium, Sodium, Chloride, Phosphate) before and after one typical batch cycle of MCDC operation according to an embodiment.

FIG. 4 is a chart that illustrates the individual ion migration in a microbial capacitive desalination system according to an embodiment. Ions in the desalination, anode and cathode chamber decrease from the initial point to the final. This graph indicates that the electrical potential applied to the high surface area electrodes in the desalination chamber allows for the adsorption of ions from the desalination chamber, anode chamber, and cathode chamber. Ions adsorbed from the anode chamber and cathode chamber must first migrate across the ion exchange membrane.

Figure 5:
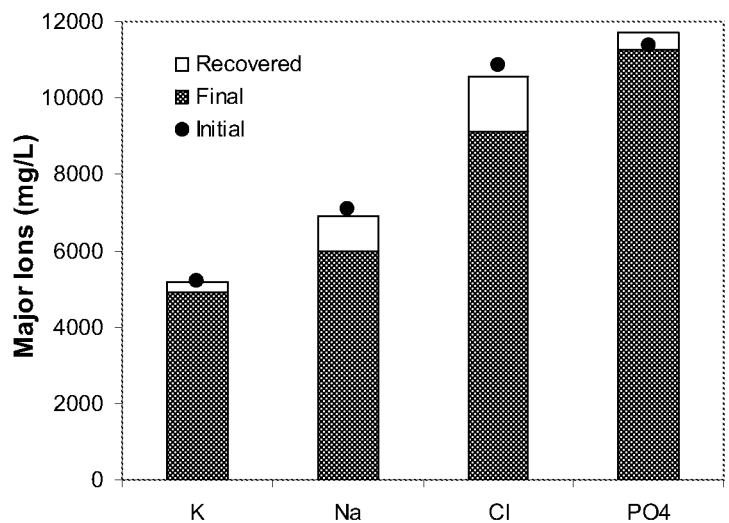
FIG. 5 illustrates initial starting point, the final point, and the ions recovered during regeneration of the high surface area electrodes in the operation of a microbial capacitive desalination system according to an embodiment.

FIG. 5 further depicts the operation of a microbial capacitive desalination system. The graphs show the initial starting point, the final point and the ions recovered during regeneration of the high surface area electrodes, for four major ions examined in the system. From the starting point as the electrical potential is applied to the high surface area electrodes all four major ions decrease in concentration. When the electrical potential is removed from the high surface area electrode the adsorbed ions can be fully released and recovered in the regenerating solution.

Figure 6:
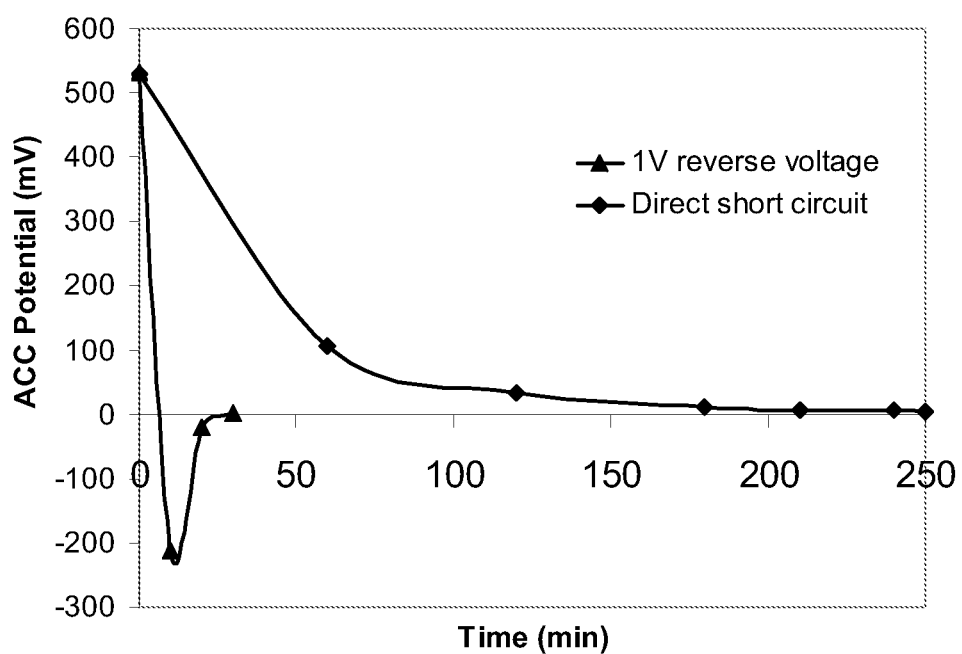
FIG. 6 illustrates electrode potential during regeneration of high surface area electrodes the operation of a microbial capacitive desalination system according to an embodiment.

FIG. 6 shows the regeneration of the high surface area electrodes. When the high surface area electrodes are connected in direct short circuit the electrical potential stored in the high surface area electrodes dissipates slowly, indicating that this system can be used as a energy storage device. If the high surface area electrodes are connected to external device, depicted in FIG. 1, the stored electrical potential can be dissipated more quickly.

Figure 7:
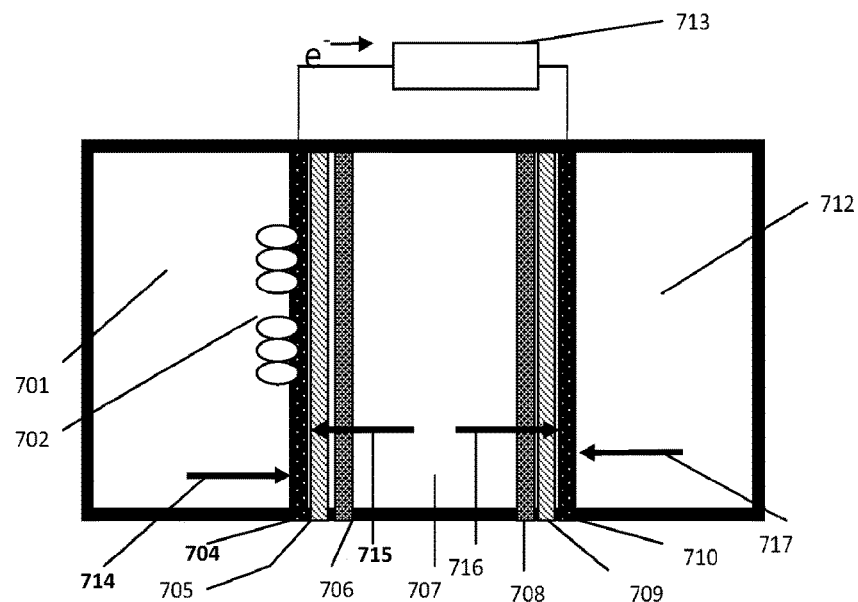
FIG. 7 illustrates general design and operation of a capacitive microbial desalination system according to an embodiment.

FIG. 7 illustrates a capacitive microbial desalination system of an embodiment. Similarly to the systems of FIGS. 1 and 2, the system of FIG. 7 includes an anode chamber 701, having an anode electrode with associated electrochemically active microorganisms 702 that is directly attached to high surface area electrode 704. High surface area electrode 704, current collector 705, and ion exchange membrane 706 separate the anode chamber from deionization or desalination chamber 707. The deionization or desalination chamber 707 is separated from cathode chamber 712, by ion exchange membrane 708, current collector 709, and high surface area electrode 710. External devices 713 may be coupled with the electrodes 704, 710, and may include one or more of resistors, DC/DC inverters, computers, power sources, capacitors, transistors, and/or other electronic devices. In operations, anions 714 move from the anode chamber 701 to the first high surface area electrode 704, anions 715 move from the desalination chamber 707 to the first high surface area electrode 704, cations 706 move from the desalination chamber 707 to the second high surface area electrode 710 in the cathode chamber 712, and cations 717 move from the cathode chamber 712 to the second high surface area electrode 710. Electrons generated in the anode chamber 701 by microorganisms 702 are transferred to anode electrode which is directly attached to high surface area electrode 704. The electrical potential generated by the microorganisms 702 applied to the high surface area electrode 704 forms a capacitor for ion adsorption. Ions in the desalination chamber 707 pass from the desalination chamber 707 through ion exchange membrane 706 and are adsorbed by the capacitor formed by the electrical potential. Electrons travel from the anode chamber 701 through external device 713 to the cathode chamber 712 where they are reduced.

Figure 8:
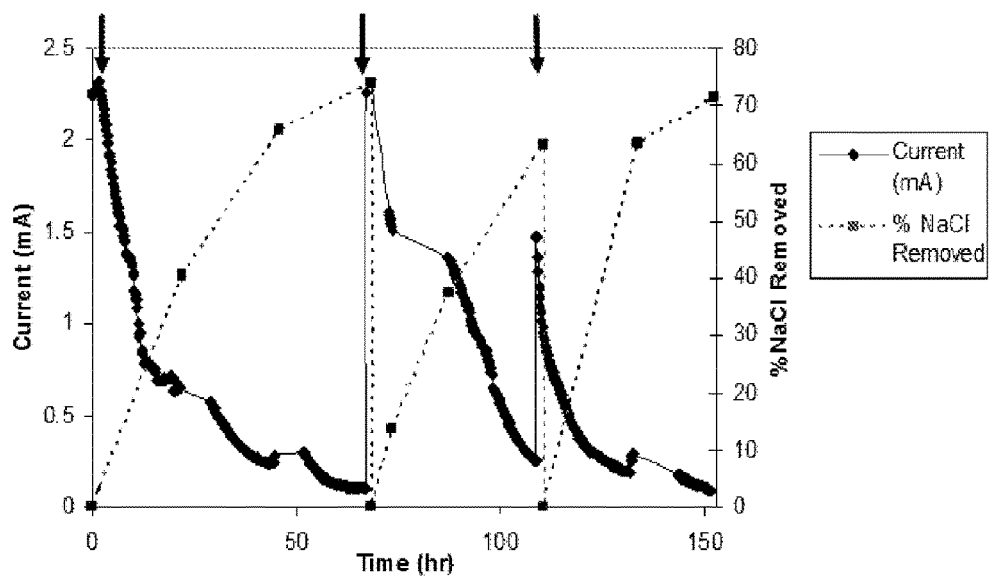
FIG. 8 illustrates the current generated by the microorganisms over time in a capacitive microbial desalination system according to an embodiment.

FIG. 8 shows the current generated by the microorganisms over time in the capacitive microbial desalination system of FIG. 7, for an embodiment. The percent salt removed from the desalination chamber increases over time, indicating desalination. The arrows show when the electrolyte media was replaced in a single batch system.

Figure 9:
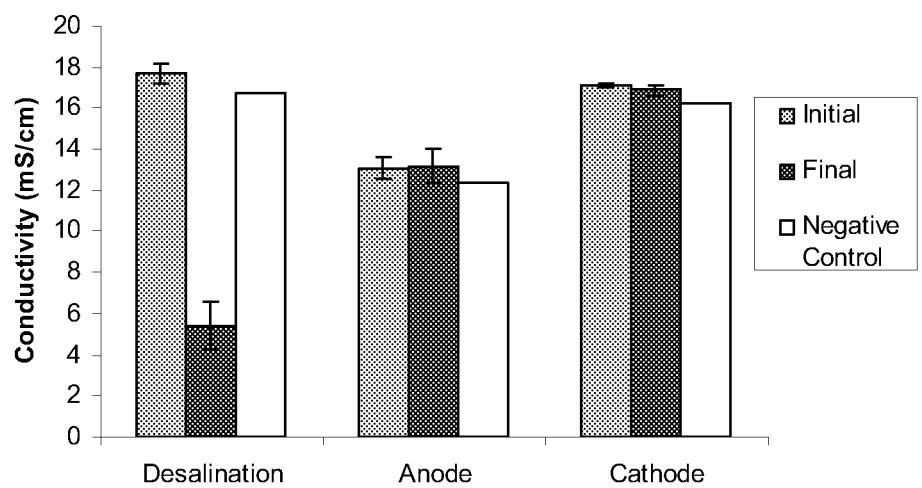
FIG. 9 illustrates the adsorptive capacity of a capacitive microbial desalination system according to an embodiment.

FIG. 9 illustrates the adsorptive capacity of the capacitive microbial desalination system of FIG. 7, for an embodiment. Ions in the desalination chamber migrate from the desalination chamber into the anode and cathode chambers. The high surface area electrodes operated as a capacitor for ion adsorption is indicated by no change in conductivity in the anode and cathode chambers.

In other embodiments deionization devices may be included that provide for deionization in a "spiral wound" or "flow through capacitor". Instead of having the electrolytes flow through framed plate modules, such as described above, the electrodes, membrane sheets, and spacers are glued together to form a leaf, and multiple leaves are rolled up around the collection tube. The anolyte and saline water may flow through separate channels, and air flow may be channeled through open pore spacers. The spacer directed electrolyte flow minimizes the distance between the electrodes and reduces internal resistance that may be present, such as resistance caused by low conductivity in wastewater, for example. The multiple layers of electrode/membrane assembly significantly increase the surface area to volume ratio, thereby providing for higher energy output. Moreover, the divided narrow channel within one spiral wound module reduces the leaking risk caused by water pressure in tubular systems.

In a flow through capacitor configuration the anode, cathode, and deionization chamber are concentrically wound into a roll with spacers, ion selective barriers, and/or electrodes between the chambers. The anode and cathode electrolytes flow separately into a chambers formed by ion selective barriers and spacers. The deionization electrolyte flows into either a separate chamber with activated electrodes or through incorporation with the cathode electrolyte. One or more of the influent points for the electrolytes are centrally located, with the effluent point(s) also centrally located, with the concentrically wound layers on the outside of the influent and effluent points. To allow for fluid to flow into the influent point(s), through the concentrically wound layers, and back to the centrally located effluent point(s), an adhesive or physical barrier may be added to form a channel. Additionally, an electrolyte solution may be added to the side of the concentrically wound layers so that flow of the electrolyte would move perpendicularly to the wound layers.

Deionization devices of still other embodiments provide deionization in a "swiss roll" configuration. In a "swiss roll" device at least two electrolyte solutions flow into the reactor from the exterior of the device. The flow moves concentrically through wound anode, cathode, and deionization chambers until the flow reaches a centrally located effluent collection tube. Additionally, an electrolyte solution may be added to the "swiss roll" device from the side of the reactor to allow flow to move perpendicularly across the wound layers.

Figure 10:
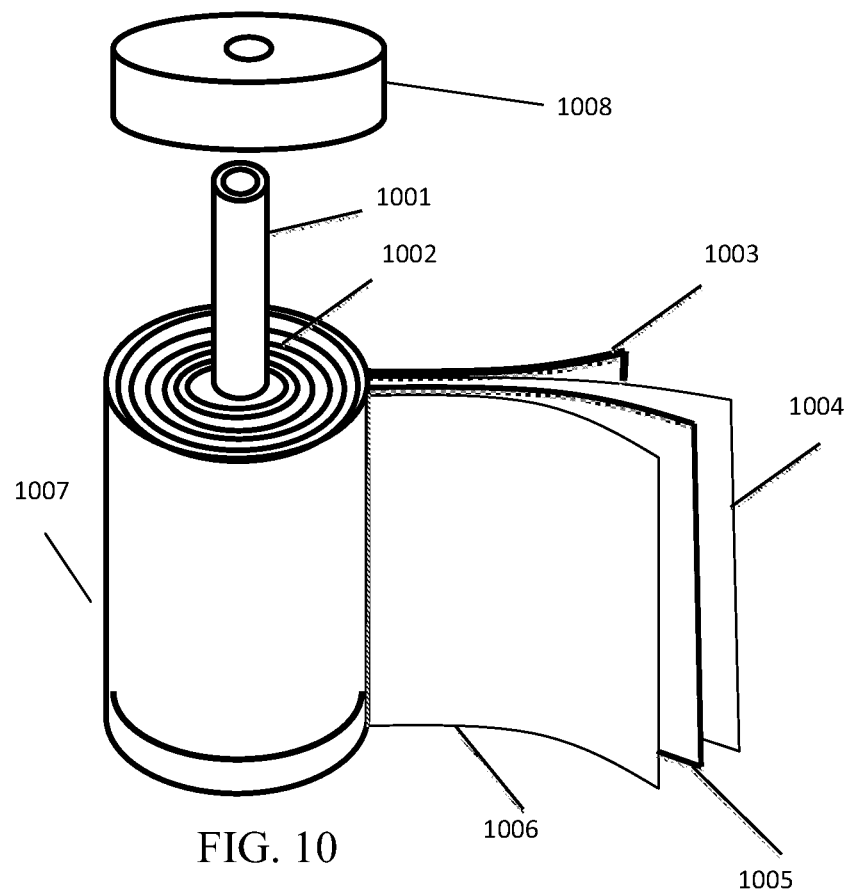
FIG. 10 illustrates the general diagram of the spiral wound bioelectrochemical system according to an embodiment.

With reference now to FIG. 10, a general diagram of the spiral wound bioelectrochemical system of various embodiments is described. The system includes one or more influent and effluent ports connected to multiple layers which could include anode electrodes, high surface area electrodes, separators, cathodes or impermeable materials. In the embodiment of FIG. 10, the system includes an electrolyte influent/effluent tube 1001, concentrically wound layers 1002 which may provide for passive electrolyte influent and effluent, and an outer layer 1003, which may be a membrane, electrode, separator, or impermeable layer. A first middle layer 1004 may be a membrane, spacer, electrode, or separator; a second middle layer 1005 may, likewise, be a membrane, spacer, electrode, or separator; and an inner layer 1006 may be a membrane, spacer, electrode, or separator. The tube 1001 and layers 1003-1006 may be housed in a container 1007 having an end cap 1008.

Figure 11:
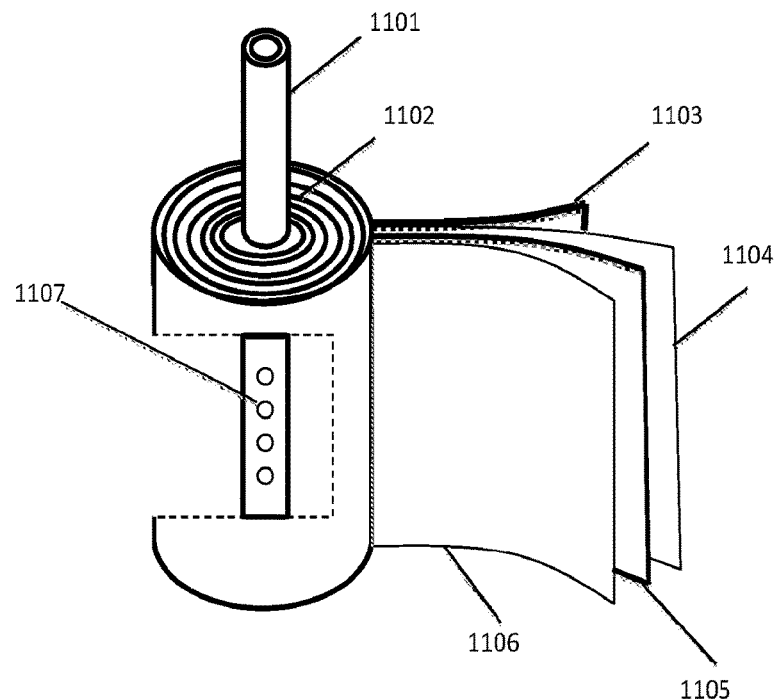
FIG. 11 illustrates a cut out of general form of the microbial spiral wound system according to an embodiment.

FIG. 11 shows a system of FIG. 10, partially in cross-section, that illustrates an electrolyte distribution layer 1107 that includes apertures that allow electrolytes to be distributed to the different layers that are concentrically wound around the center tube 1101. The system of FIG. 11, similarly as FIG. 10, includes electrolyte influent/effluent tube 1101, concentrically wound layers 1102 which may provide for passive or active electrolyte influent and effluent, and an outer layer 1103, which may be a membrane, spacer, electrode, separator, impermeable layer. A first middle layer 1104 may be a membrane, spacer, electrode, or separator; a second middle layer 1105 may, likewise, be a membrane, spacer, electrode, or separator; and an inner layer 1106 may be a membrane, spacer, electrode, or separator. The spiral wound system of FIG. 11 may also be housed in a container, as described with respect to FIG. 10.

Figure 12:
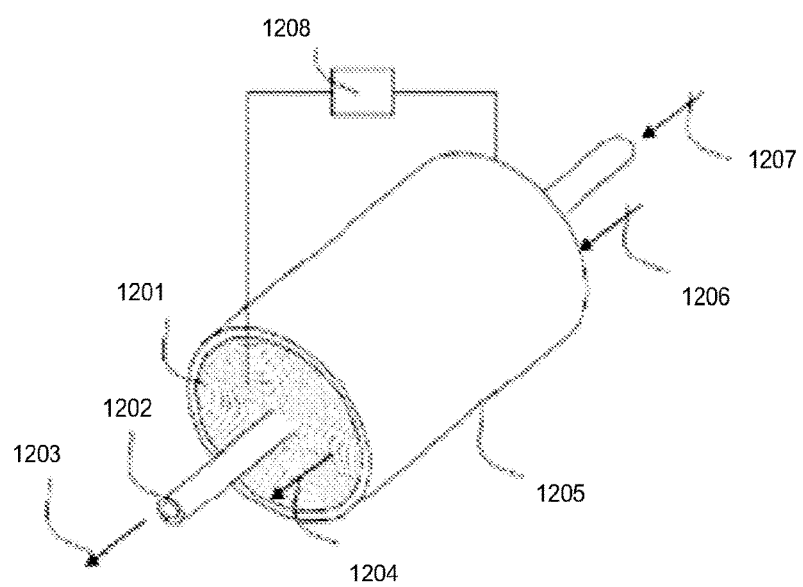
FIG. 12 illustrates the operation of the microbial spiral wound system according to an embodiment.

FIG. 12 depicts the operation of a microbial spiral wound system, where electrolytes flow into one or more tubes and are distributed into different layers of electrodes, spacers, current collectors, membranes, or impermeable material. In addition to electrolytes flowing into one or more tubes, electrolytes can passively flow across the concentrically wound layer. Current produced in the anode chamber is transferred through an external device such as a resistor to the cathode electrode where the electrons are terminally reduced. In the embodiment of FIG. 12, concentrically wound layers 1201 are wound around effluent center tube 1202. Effluent flow from center tube 1202 is depicted by arrow 1203, and influent flow into center tube 1212 is depicted by arrow 1207. Additionally, effluent flow from space between concentrically wound layers is depicted at 1204, and influent flow into space between concentrically wound layers is depicted at 1206. An outer layer or container for the microbial spiral wound system 1205 may house portions of the system. An external device 1208 may be coupled with the system, which may include one or more of resistors, capacitors, transistors, power sources, and/or other electronic devices.

In one embodiment, a 10-layer spiral-wound BES using an activated carbon cloth electrode provides a surface/volume ratio can be increased by about 56 times as compared to a traditional tubular BES. In one embodiment, a spiral wound BES provides a surface/volume ratio of about 350 $m^2/m^3$. Such a BES in some situations may be operated to provide a power density in excess of 1 $kW/m^3$, which has been considered the threshold for larger scale applications. In various embodiments, a spiral wound BES includes multiple layers of membranes, spacers, and electrodes in a leaf cell. Activated carbon cloth may be used as the electrode material, although other materials may be used as well. Carbon cloth has a relatively high surface area and low price, making it attractive for many applications. Separators such as ion exchange membranes and glass fibers may be used to insulate the electrodes to prevent short circuits.

Figure 13:
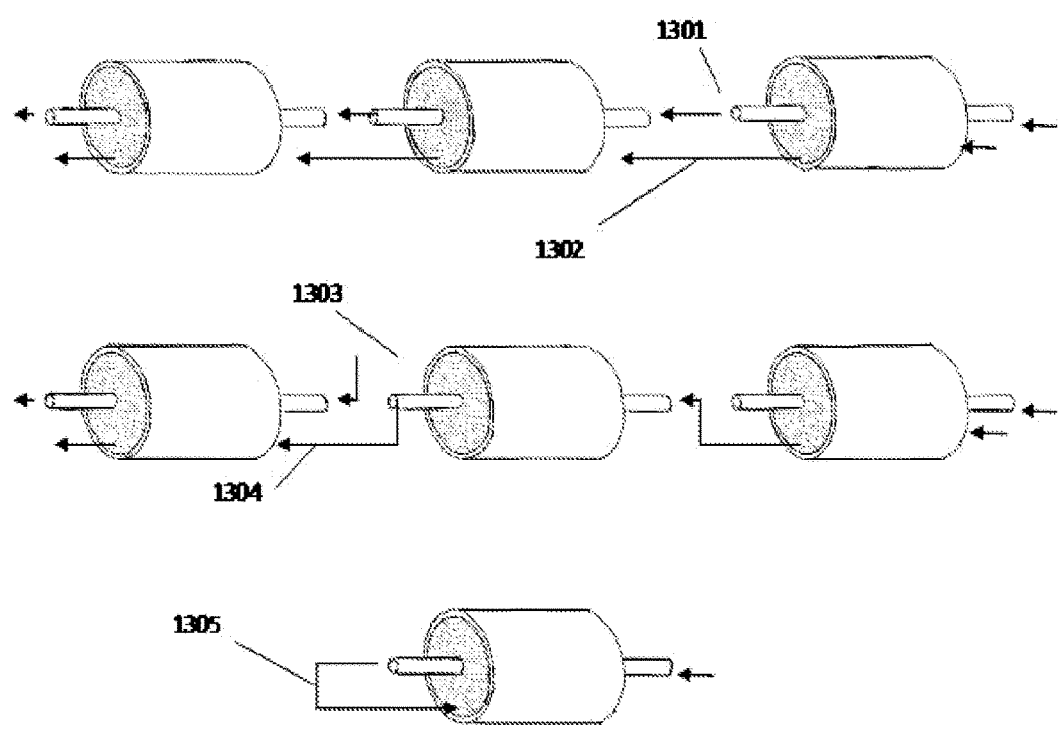
FIG. 13 illustrates some exemplary flow pathways between one or more microbial spiral wound systems according to various embodiments.

FIG. 13 depicts some exemplary flow pathways between one or more microbial spiral wound systems. Other flow pathways will be readily recognized by one of skill in the art, as numerous different options are available for such pathways. For example, fluid can flow from the center tube of a first system to a second system center tube, as illustrated at 1301. In another example, effluent may flow from space between concentrically wound layers flowing into second passive flow space between concentrically wound layers of another system, as illustrated at 1302. In still another example, effluent may flow from space between concentrically wound layers of a first system to the center tube of a second microbial spiral wound device, as illustrated at 1303. In still another example, fluid can flow from the center tube of a first system to passive flow space between the layers of a second system as illustrated at 1304. Fluid may also flow from the center tube to of a reactor to the passive flow space of the same reactor, as illustrated at 1305.

Figure 14:
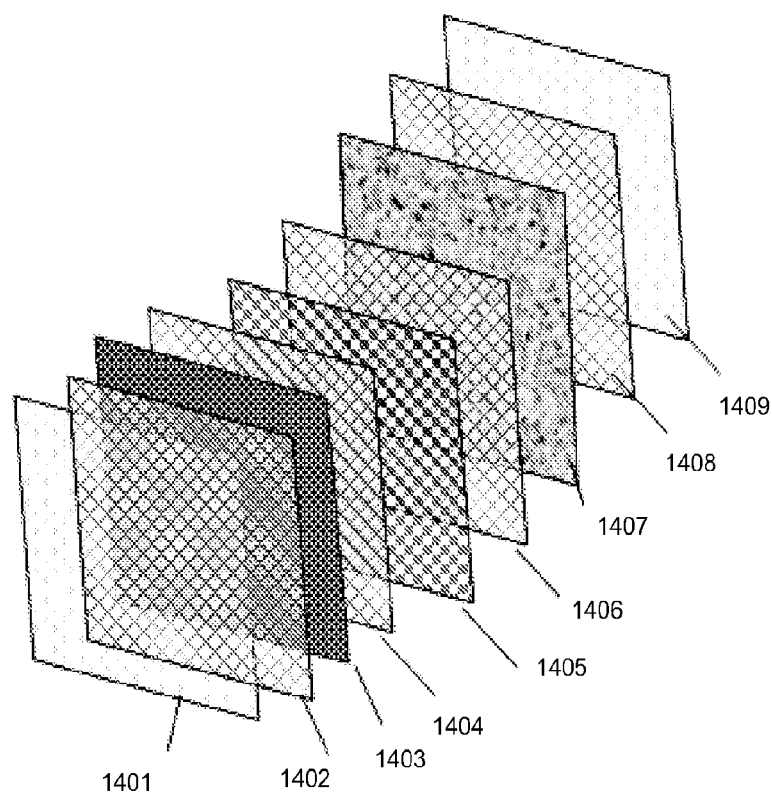
FIG. 14 illustrates different layers in a microbial spiral wound system according to an embodiment.

FIG. 14 illustrates composition of the different layers in the microbial spiral wound system of an embodiment. This embodiment includes nine layers, from the inside to the outside: (1) a non-permeable material 1401, (2) a spacer 1402, (3) an anode electrode 1403, (4) a spacer 1404, (5) an ion exchange membrane 1405, (6) a spacer 1406, (7) a cathode electrode 1407, (8) a spacer 1408, and (9) a non-permeable material 1409. The two outer layers in this embodiment are not permeable and provide for solution containment. The anode and cathodes are separated by spacers and/or separators. The spacers may be used to direct liquid flow. In some cases, there can be multiple alternative layers of anion and cation exchange membranes between the anode and cathode chambers to form stacks or desalination chambers, as depicted in FIGS. 1, 2, 7. Also, the cathode can be exposed directly to air as an air-cathode, so the spacer and non permeable layer may be omitted according to various embodiments.

Figure 15:
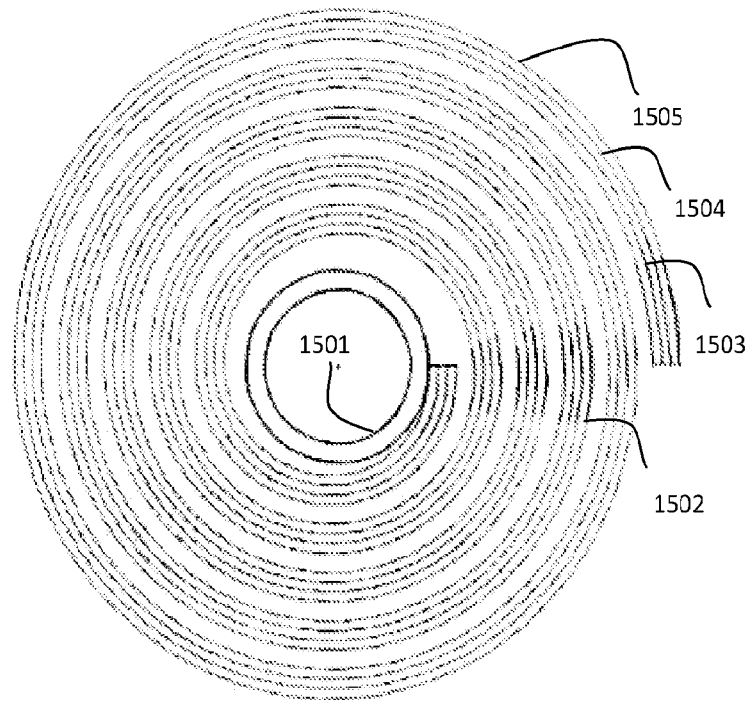
FIG. 15 illustrates a cross sectional view of an exemplary concentrically wound microbial spiral wound system according to an embodiment.

FIG. 15 illustrates a cross sectional view of one option for the concentrically wound microbial spiral wound system. In this embodiment, electrolyte enters and exits the concentrically wound layers from a center tube 1501. Concentrically wound layers 1502 are wrapped around center tube 1501, with space for passive flow. In this embodiment, the layers include an inner layer 1503, a middle layer 1504, and an outer layer 1505. Various modifications to this design may be implemented, such as embodiments that have multiple influent and effluent tubes, with the influent and effluent entering and exiting from multiple points of the concentrically wound system, for example.

Figure 16:
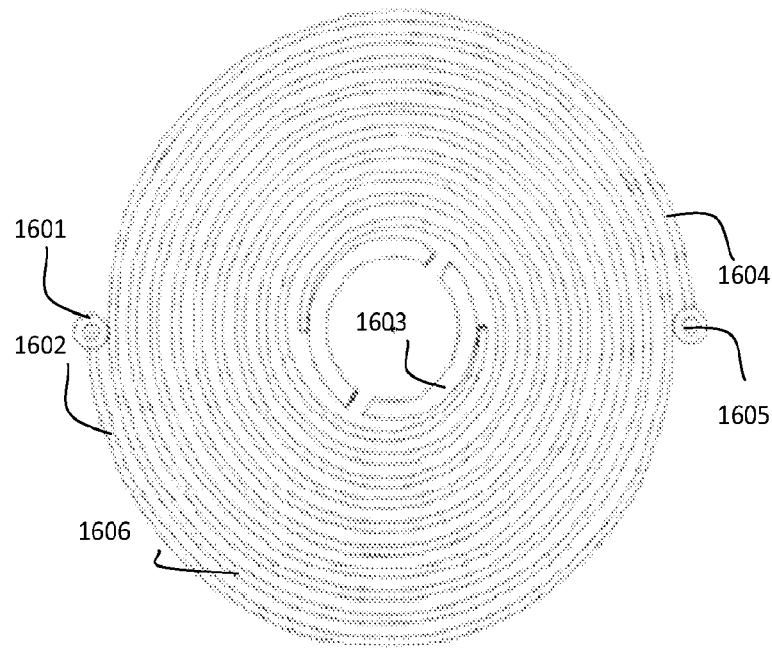
FIG. 16 illustrates an exemplary winding for a microbial spiral wound system according to an embodiment.

FIG. 16 shows one option for winding the microbial spiral wound system where two electrolytes enter tubes from the outside of wound layers, and the electrolytes flow through the system until they are expelled by a center tube. Additionally, a space between the two different concentrically wound layers allows for passive fluid flow. In this embodiment, a first electrolyte influent 1601 is provided. First concentrically wound layers 1602 are wound around an effluent tube 1603 for the first and second electrolytes. A second set of concentrically wound layers 1604 is also wound around tube 1603. A second electrolyte influent is provided at 1605, and a space for passive fluid flow is provided at 1606.

Figure 17:
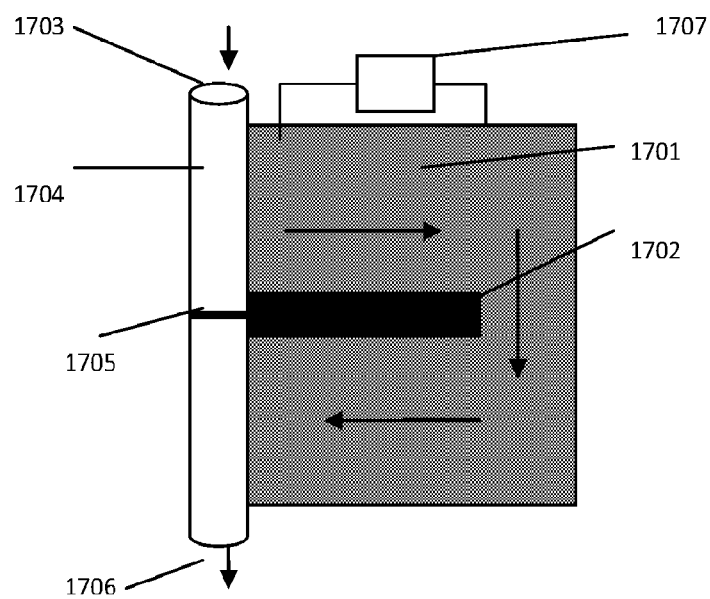
FIG. 17 illustrates an exemplary fluid flow in an unrolled microbial spiral wound system according to an embodiment.

FIG. 17 shows an exemplary fluid flow in an unrolled microbial spiral wound system according to an embodiment. Electrolyte fluid flows into one end of a center tube 1704 at an influent 1703, and enters a chamber 1701 formed by two or more layers, the fluid flows around a barrier 1702 in a U shape back to the original center tube to exit the reactor at effluent point 1706. A center tube barrier 1705 provides a barrier to center tube 1705. An external device 1707 may be coupled with the system, which may include one or more of resistors, capacitors, power sources, and/or other electronic devices.

Figure 18:
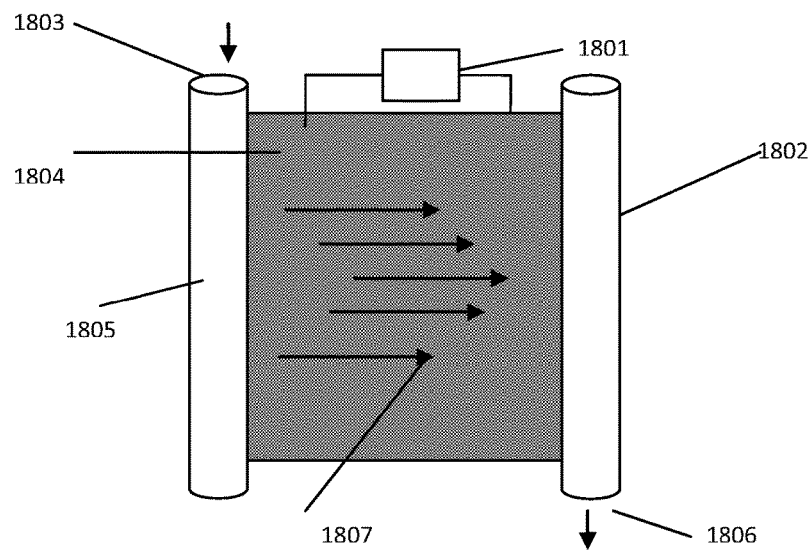
FIG. 18 illustrates an exemplary electrolyte fluid flow in an unrolled microbial spiral wound system according to an embodiment.

FIG. 18 shows an exemplary electrolyte fluid flow in an unrolled microbial spiral wound system according to an embodiment. In this embodiment, electrolyte fluid flows into a centrically located tube 1805, as indicated at 1803. The fluid then flows into a chamber 1804 formed by two or more layers. The fluid flows inside the chamber 1804 as indicated by arrows 1807, and to a second tube 1802 which is used to expel the fluid at effluent point 1806. One or more external devices 1801 may be coupled with the chamber 1804, similarly as discussed above.

Figure 19:
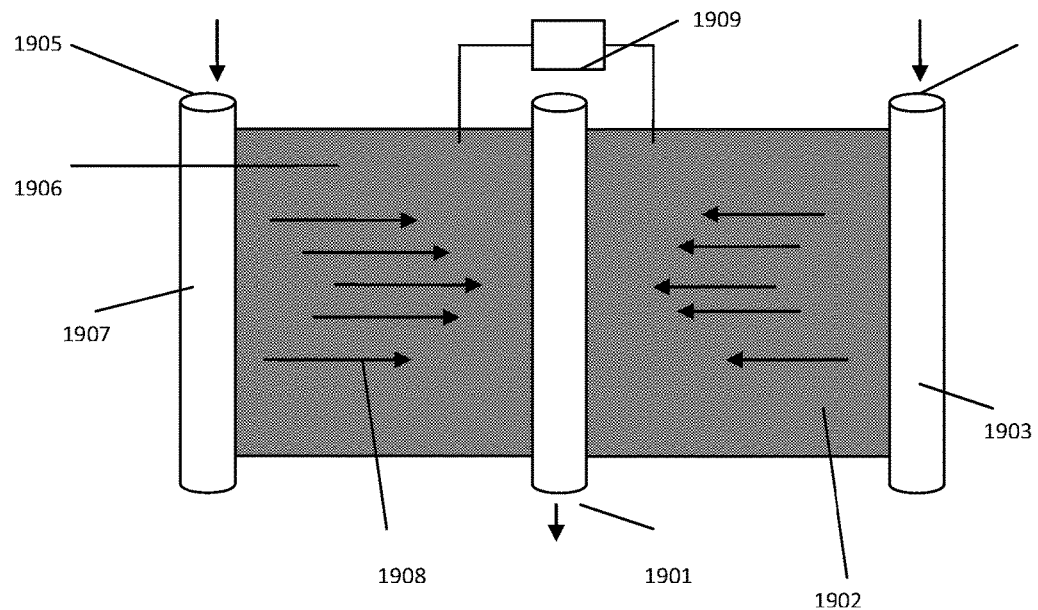
FIG. 19 illustrates one of the options for fluid flow in an unrolled microbial spiral wound system according to an embodiment.

With reference now to FIG. 19 another option for fluid flow in an unrolled microbial spiral wound system is described. In this embodiment, electrolyte fluid enters the system through inlets 1904 and 1905 of two tubes 1903 and 1907. Fluid flows into two separated chambers 1902 and 1906 and exit the system by flowing into a centrically located tube 1901. The fluid flows inside the chambers 1902 and 1906 as indicated by arrows 1908. One or more external devices 1909 may be coupled with the chambers 1902 and 1906, similarly as discussed above.

Figure 20:
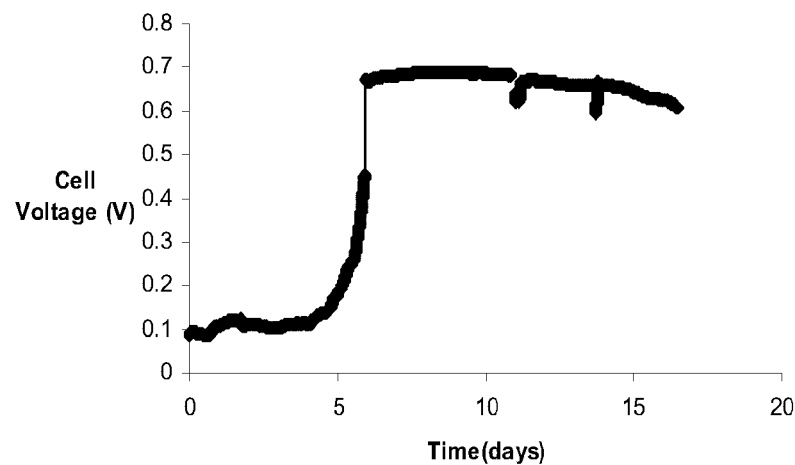
FIG. 20 illustrates cell voltage during the startup and operation of a microbial spiral wound system according to an embodiment.

FIG. 20 shows the startup and operation of an exemplary microbial spiral wound system, such as the system of FIG. 12. The system in this embodiment acclimated in approximately 5 days and reached a maximum voltage potential of 680 mV. The system was operated continuously at a high voltage for over 15 days. Carbon cloth was used as an exemplary electrode material, and the anode and cathode were connected using a 1000 ohm external resistor. Voltage across the resistor was recorded every 66 seconds using a data acquisition system.

Figure 21:
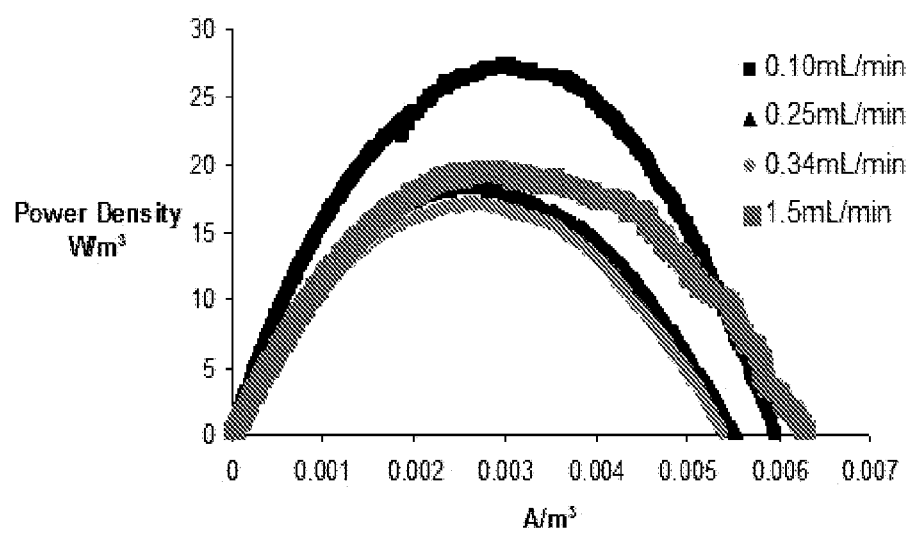
FIG. 21 illustrates the power density per cubic meter of anode fluid at different anolyte flow rates in a microbial spiral wound system according to an embodiment.

FIG. 21 shows the power density per cubic meter of anode fluid versus current density at different anolyte flow rates in the same microbial spiral wound system described in FIG. 12 and FIG. 20. The curve relationship was measured and plotted using a potentiostat with the linear sweep voltammetry method at a scan rate of 0.1 mV/sec. The highest power density was achieved at a flow rate of 0.10 mL/min.

Figure 22:
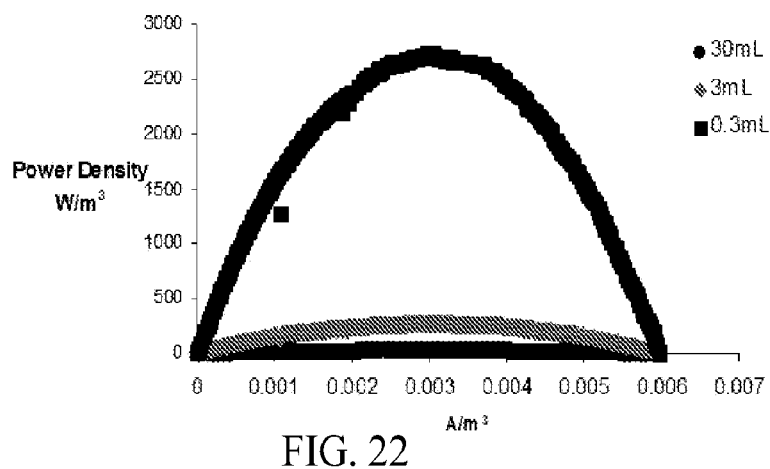
FIG. 22 illustrates power density per cubic meter of anode fluid at different anode chamber volumes in a microbial spiral wound system according to an embodiment.

FIG. 22 shows the power density per cubic meter of anode fluid versus current density at different anode chamber volumes in the same microbial spiral wound system described in FIGS. 12, 20, and 21. Same linear sweep voltammetry was used to measure the relationships. The highest power density was achieved at a volume of 0.3 mL.

Figure 23:
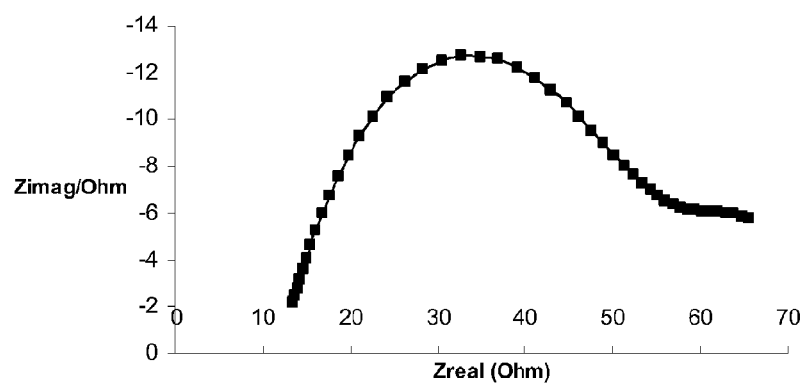
FIG. 23 illustrates the internal resistance for a microbial spiral wound system according to an embodiment

FIG. 23 shows the internal resistance for a microbial spiral wound system, such as the system of FIG. 12. The ohmic resistance was identified by the electrochemical impedance spectroscopy test using a potentiostat. Data was plotted using a Nyquist plot where the ohmic resistance is defined as the intercept of the Zreal axis. The internal resistance for the microbial spiral wound system was identified to be 13 ohms.

Figure 24:
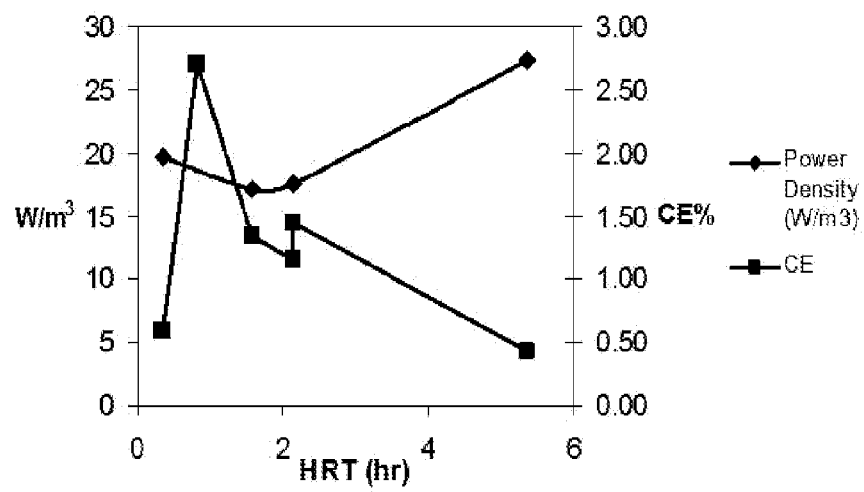
FIG. 24 illustrates the correlation between the power density per cubic meter and the coulombic efficiency for a microbial spiral wound system according to an embodiment.

FIG. 24 shows the correlation between the power density per cubic meter and the coulombic efficiency (CE) for a microbial spiral wound system, such as the system of FIG. 12. Coulombic efficiency is calculated based on the fraction of electrons removed from the electron donors that are recovered as current through the external circuit, and power density is calculated based on ohmic law (P=VI).

In the exemplary embodiments described above, various methodology and reactor configurations for the microbial capacitive deionization cell are described in general. The electrodes, spacers, electrolytes, current collectors, ion selective barriers, catalysis, microbes, substrates, and associated components may all be modified based on particular applications in which the reactor may be used.

Electrodes

Electrodes in the present invention are described as electrically conductive. The electrodes themselves have various shapes and sizes including but not limited to powder, granules, fibers, polymers, rods, felt, paper, wool, cloth, and brushes.

Anode Electrode

The following is a list of exemplary materials for use as the anode according to various embodiments of the present invention: carbon cloth, carbon felt, activated carbon cloth, carbon wool, graphite fiber, conductive polymer, metal mesh (Ti, Cu, Ni, Ag, Au, Steel), graphite brush, graphite paper, carbon aerogel, carbon nanotubes, graphene, and biochar. Any of the previous conductive electrode material may be uses in any combination with each other.

Cathode Electrode

The following is a list of exemplary materials for use as the cathode according to various embodiments of the present invention: carbon cloth, carbon felt, activated carbon cloth, carbon wool, graphite fiber, conductive polymer, metal mesh (Ti, Cu, Ni, Ag, Au, Steel), graphite brush, graphite paper, carbon aerogel, carbon nanotubes, biochar, carbon cloth with catalysis coating, Teflon coated carbon cloth with catalysis coating for use as an air cathode, graphene.

Adsorptive Electrode

The following is a list of exemplary materials for use as the adsorptive electrode material according to various embodiments of the present invention: activated carbon cloth, activated carbon cloth with imbedded titania, carbon aerogels as monoliths, carbon aerogels as powders, carbon aerogel in microsphere form, carbon aerogels in thin film composites, carbon aerogel silica modified, carbon felt, carbon black, sintered activated carbons, carbon nanotubes, biochar, and black magnetite ($Fe_3O_4$)

Current Collectors

Current collectors, as used in the present disclosure, refer to electrodes for the purpose of enhancing the electrical conductivity of the electrode materials. The following is a list of exemplary materials for use as current collectors: aluminum, copper, titanium, stainless steel, nickel foils, graphite, and graphene.

Spacers

Spacers, as used in the present disclosure, refer to non conductive material added to the reactor devices to provide a space for fluids to flow or prevent conductive materials from connecting. The following is a list of exemplary materials for the use as a spacer in various embodiments: nylon, polyester, polyethylene, polypropylene, PEEK, PETG, PTFE, and PVC. All of the previous materials for spacers may be, for example, solid sheets or in a mesh format with the following mesh designs: woven, perforated, knitted, and molded.

Ion Selective Barriers

Ion selective barriers according to various embodiments are defined as barriers allowing for the transport of ion specific molecules. The following is a list of exemplary ion selective barriers: anion exchange membranes, cation exchange membranes, proton exchange membranes, ultrafiltration membranes, bipolar membranes, and ion exchange resins.

Catalyst

A catalyst is described in the present disclosure as enhancing a desired reaction. The following is a list of exemplary catalyst for various embodiments: platinum, nickel, copper, tin, iron, palladium, cobalt, tungsten, CoTMPP, and microbes.

Microbes

Microbes in the present disclosure refer to any microorganism that can exoelectrogenically transfer electrons. This includes microbe for the selective transfer of electrons to an anode, as well as electrons capable of accepting electrons from an electrode. Examples of microbial families capable of exoelectrogenic transfer are: Aeromonadaceae, Alteromonadeceane, Clostridiaceae, Comamonadaceae, Desulfuromonaceae, Enterobacteriaceae, Geobacteraceae, Pasturelaceae, and Pseudomonadaceae.

Electrolytes Generally

Electrolytes in the present disclosure are defined as a solution containing dissolved charged ions. The electrolyte may be used as the substrate for energy production, electron acceptance, or specifically for ion removal.

Anolyte

The anolyte in the present disclosure is the electrolyte solution added to the anode chamber of the devices. Various embodiments of the present disclosure are designed to specifically use wastewater containing various substrates for energy production. The following is a list of exemplary substrates: carbohydrates, proteins, lipids, food waste, municipal waste, agricultural waste, industrial waste, produced water, reduced sulfur molecules, reduced iron molecules.

Catholyte

The following is a list of exemplary catholytes for use in the present disclosure: potassium ferricyanide, solid peroxides, potassium permanganate, oxygenated water, trichloroethylene, persulfate, and oxidized uranium.

Deionization Electrolytes

The following is a list of exemplary electrolyte for deionization in the present disclosure: saline water with 3-50 parts per thousand TDS, brackish water with 0.5-3 part per thousands TDS, "produced water" from oil or natural gas production containing hydrocarbon and saline water, fresh water with micropollutants including but not limited to nitrates, phosphates, perchlorates, and bromates, Associated Components:

The following is a list of exemplary associated components for the present disclosure: pumps, valves, external power source, gas collection device, external power collector, external conductors, external inducers, switches, and external resistors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A bioelectrochemical system (BES) reactor comprising:
   a centrally located tube;
   a spirally wound reactor chamber comprising one or more sheets of anode electrode layer, one or more separator or membrane sheets, and one or more spacer sheets that are spirally wound around the centrally located tube; and
   one or more cathode electrode layers comprising one or more of catholyte or diffuse as an electron acceptor, operatively coupled to the reactor chamber;
   one or more deionization or desalination chambers located between a pair of carbon electrodes and between one or more the anode electrode layer and the cathode electrode layer containing salt electrolyte solution;
   wherein anolyte enters the reactor from the centrally located tube and flows through reactor chamber, and is expelled out of the reactor, chemicals in the anolyte and catholyte react with the anode electrode and cathode electrode layers to produce a potential difference between the anode and the cathode, and wherein ions from the electrolyte are attracted and captured onto the carbon electrodes under the potential.

2. The BES reactor of claim 1, wherein the anode electrode comprises natural or acclimated microorganisms or reactive enzymes that catalyze the electrochemical reactions and generate an electrical potential between the anode electrode and cathode electrode.

3. The BES reactor of claim 1, wherein the anolyte enters the reactor from the centrally located tube through perforated holes contained inside the reactor chamber and exits the reactor after biochemical reactions.

4. The BES reactor of claim 1, wherein the diffused gas comprises air or aqueous catholyte that enters the reactor chamber from other than the centrally located tube, and exits the reactor after reactions.

5. The BES reactor of claim 1, wherein the spirally would reactor chamber comprises an anode electrode, a porous spacer, a separator or ion selective membrane, an electrolyte chamber, and a cathode.

6. The BES reactor of claim 1, wherein the anolyte flows through the reactor chamber passively or actively.

7. The BES reactor of claim 1, wherein the anolyte flows through the reactor chamber through a series of channels formed by one or more membranes or physical separators.

8. The BES reactor of claim 1, wherein the cathode comprises an air-permeable cathode or chemical electrolyte cathode.

9. The BES reactor of claim 1, wherein the spirally wound reactor chamber provides a surface area to volume ratio of at least 100 $m^2/m^3$, thereby providing a hither energy and chemical product output density relative to a non-spirally wound reactor chamber with lower surface to volume ratio.

* * * * *